July 10, 1934.  G. M. BELLANCA  1,965,790
IMPROVED WING STRUCTURE
Filed Feb. 5, 1932   2 Sheets-Sheet 1
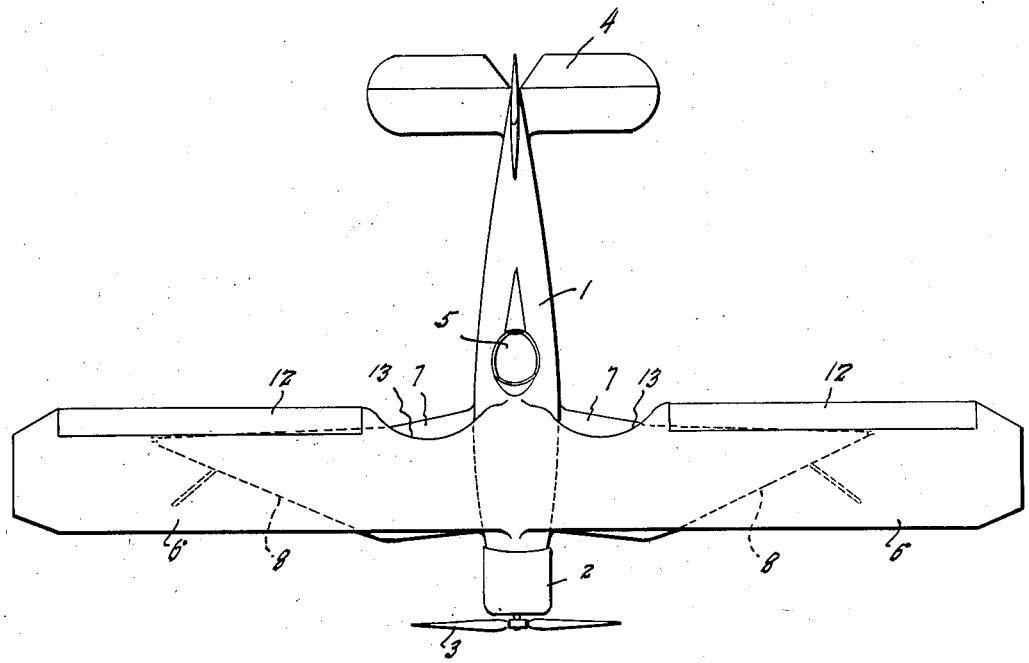
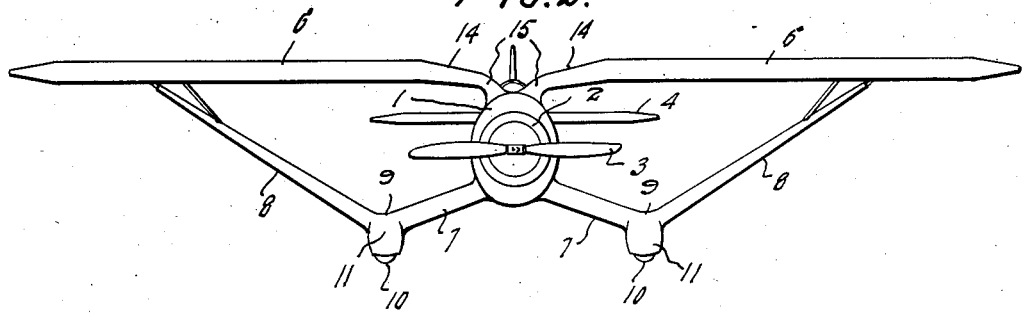
Inventor
GIUSEPPE M. BELLANCA
By Semmes & Semmes
Attorneys July 10, 1934.  G. M. BELLANCA  1,965,790
IMPROVED WING STRUCTURE
Filed Feb. 5, 1932   2 Sheets-Sheet 2
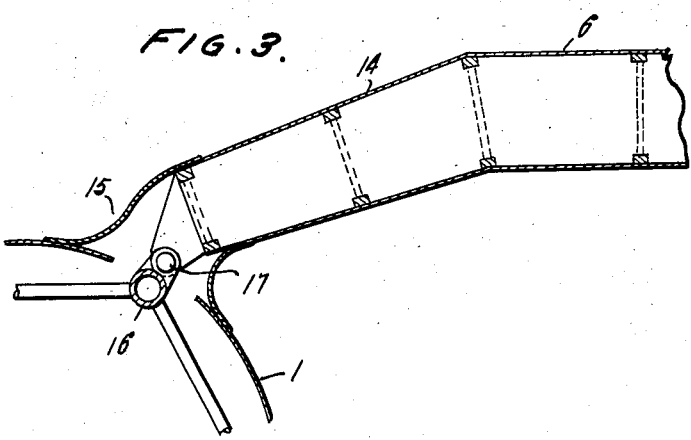
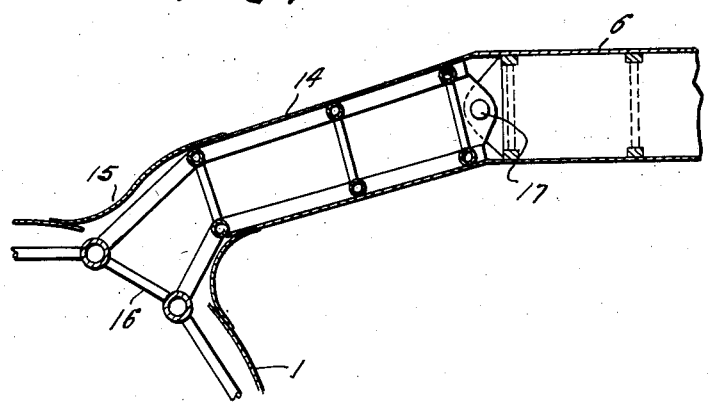
Inventor
GIUSEPPE M. BELLANCA
By
Attorney Patented July 10, 1934

1,965,790

UNITED STATES PATENT OFFICE 1,965,790

IMPROVED WING STRUCTURE

Giuseppi M. Bellanca, New Castle, Del.

Application February 5, 1932, Serial No. 591,146.

5 Claims. (Cl. 244—12)

This invention relates to improvements in airplanes and more particularly to improved wing structures.

A major object of the invention is to provide an airplane of the high wing monoplane type which provides optimum visibility.

Another object is to devise a novel wing structure which combines the advantages of structural rigidity with high visibility.

With these and other equally important objects in view the invention comprehends a novel type of airplane, preferably of the open cockpit type, with which is associated a monoplane wing specially designed and constructed to insure maximum visibility to the pilot while securing aerodynamical advantages. In order to fully explain the invention the preferred embodiment is shown in the accompanying drawings, in which:

Figure 1 is a plan view of a plane embodying the invention.

Fig. 2 is a front elevation.

Figure 3 is an enlarged detail view of one form of wing-fuselage attachment.

Figure 4 is a detail of another form of wing attachment.

As shown in the drawings, the plane may comprise a fuselage 1 at the forward end of which is mounted a power plant 2 and associated tractor propeller 3 and at the rear of which is assembled the empennage 4 comprising the conventional units.

The fuselage 1 is of stream-line form and is provided with the open cockpit 5. This cockpit has the usual head rest and visor.

Preferably the plane is of the sesqui-plane type having a main wing 6, two stub wings 7 and two lift wings 8. The stub wings preferably extend downwardly from the fuselage and are joined at 9 to the lift struts or wings 8. At the joint 9 the landing wheels 10 are mounted and the fairing 11 is extended downwardly and continuously with the surfaces of the supplemental wings 7 and 8 so as to almost completely enclose the landing wheels 10. Preferably also the dihedral wings 7 extend slightly forwardly. The lift wing 8, in the preferred modification, is substantially triangularly formed so that the leading edge presents a decided sweepback with respect to the leading edge of the main wing.

The upper wing 6 is provided with the ailerons 12 of any approved design or construction. Instead of constructing the main wing 6 as a substantially horizontal plane member, a special construction and design is employed. As will be noted from inspection of Fig. 1, those portions of the wings positioned at the trailing edge respectively adjacent the fuselage are cutaway so as to provide a section 13 which is of slightly less chord than the remainder of the wing. Likewise this portion 13 is cut away or tapered on the undersurface of the wing whereas on the upper surface the wing contour is maintained.

In addition to this and as will be seen from inspection of Fig. 2, the roots of the wing sections 6 are of special construction and resemble in outline a gull wing. The wing sections adjacent the fuselage are of somewhat reduced camber, as shown at 14. At the point closely adjacent the fuselage the wings are extended downwardly, as at 15, and are then attached to the fuselage. The purpose of this construction, as noted hereinbefore, is to provide a monoplane with a high wing attached directly to the fuselage but which yet permits maximum visibility for the pilot. It will be observed that the fore and aft view of the pilot is uninterrupted due to the rather deep depression formed on the longitudinal axis of the plane by reason of the special construction of the inner end or roots of the wing. While this perfect fore and aft line of sight is permitted, yet the major portion of the wing nevertheless is positioned considerably above this line of sight. Not only is complete fore and aft vision permitted to the pilot, but also maximum visibility in quadrants on either side of the fuselage is likewise permitted. The depth of the cutback portion 13 and the extent of the taper on the underside of the wing and at its cutback, and the dihedral angle of the wing 7, are so proportioned that the pilot may have unobstructed vision beneath the main wing 3 at all points in front of the wing 7 and landing wheel 10. Of course, at all points above the fuselage and at all points to the rear of the trailing edge of the main wing, the pilot has unobstructed view. Due to the sweepback of the planes 8 and to their attachment to the rear spar of the wing, a wide area of lateral vision underneath the main wing is insured.

The wings may be secured or attached to the fuselage in any approved manner as for example by the typical hinge construction as shown in Figure 3. The inner or root end of the wing may be provided with suitable, rugged wing fittings which are attached or hinged to the longéron or bulkhead structure, 16, of the fuselage. As is known by those skilled in the art plurality of fittings and connecting means, 17, are utilized so as to insure a strong, rugged mounting of the wing.

If desired and as shown in Figure 4, the root section 14 of the wing may be rigidly attached to the longéron or other structural members of the fuselage, and the main horizontal section 6 may be attached to the section 14 by means of the usual fittings and attaching means, 17. All such suitable methods of attaching the wing to the fuselage may be defined as a means to hinge the wing to the fuselage.

It will be further noted that these improved vision characteristics of the airplane as a whole do not in any way minimize any aerodynamic advantages. The main wing 6, for its major extent, is in all respects a high monoplane wing and in fact can be so constructed as to be positioned well above the fuselage. The advantages of such a high wing are nevertheless secured in a wing which is directly attached to the fuselage, thus permitting a clear unobstructed space directly in front of the pilot.

While a preferred modification of the invention has been described, it is understood that although one embodiment has been described this has been given to explain the principles of the invention involved and not as the exclusive method of incorporating these principles in an airplane structure.

I claim:

1. An airplane of the monoplane type comprising a fuselage having a power plant and an empennage, a main wing having a depressed root portion of reduced chord hinged directly to the top of the fuselage but laterally of the longitudinal axis of the fuselage, the wing being tapered on its underside at the trailing edge in said portion of reduced chord, a stub wing of relatively short span attached to the fuselage and extending laterally therefrom and a lift wing connected at one end to the stub wing and at its other end to the underside of the main wing.

2. An airplane comprising a fuselage having a power plant and an empennage, a main wing having a substantially horizontal portion extending laterally from and above the fuselage, the inner end of the wing being extended downwardly and hinged directly to the upper surface of the fuselage at a point laterally spaced from the longitudinal center of the fuselage so that, in elevation, the wing presents a substantially "gull" shape, a stub wing of decided negative dihedral secured to a lower portion of the fuselage, said stub wing having a leading edge set with a decided sweepforward and a lift strut attached respectively to the stub wing and the main wing, said left strut being of gradually diminishing chord from root to tip.

3. An airplane comprising a fuselage having a power plant and an empennage; a main wing having a substantially horizontal portion extending laterally from the fuselage, the inner or root end of the main wing being extended downwardly and attached to an upper portion of the fuselage at a point spaced from the longitudinal center of the fuselage so that, in elevation, the wing presents a substantially gull shape; a stub wing secured to a lower portion of the fuselage, the stub wing having a leading edge set with a sweepforward and a lift strut attached respectively to the stub wing and the underside of the main wing.

4. An airplane comprising a fuselage having a power plane and an empennage; a main wing having a substantially horizontal portion extending laterally from the fuselage, the root end of the main wing being extended downwardly and hinged directly to an upper portion of the fuselage, said inner root section being of reduced chord and having the underside, near the trailing edge, tapered to produce a relatively thin rear trailing section without disturbing the cambre of the leading edge portion of the root section, a stub wing secured to a lower portion of the fuselage, the stub wing having a leading edge set with a sweepforward and a lift strut attached respectively to the stub wing and the underside of the main wing; the sweepforward of the stub wing and the contour of the undersurface of the trailing edge of the root section being so arranged and designed as to permit a decided line of sight to the pilot.

5. An airplane comprising a fuselage provided with a power plant and an empennage; a main wing having a depressed root portion of reduced chord hinged directly to the top of the fuselage but laterally of the longitudinal axis of the fuselage, the root section being tapered upwardly on its underside at the trailing edge of the root section; a lower wing attached to the lower portion of the fuselage and set on a sweepforward so as to permit a substantially vertical line of sight to the pilot and a lift wing attached at one end to the stub wing and at the other end to the underside of the main wing.

GIUSEPPI M. BELLANCA.